(12) United States Patent
Zimler et al.

(10) Patent No.: US 7,933,970 B2
(45) Date of Patent: Apr. 26, 2011

(54) METHODS, SYSTEMS, AND PRODUCTS FOR MANAGING ACCESS TO APPLICATIONS

(75) Inventors: Randy Zimler, Gainesville, GA (US); Al Hicks, Roswell, GA (US)

(73) Assignee: AT&T Intellectual Property I, L. P., Atlanta, GA (US)

( * ) Notice: Subject to any disclaimer, the term of this patent is extended or adjusted under 35 U.S.C. 154(b) by 0 days.

(21) Appl. No.: 12/353,293

(22) Filed: Jan. 14, 2009

(65) Prior Publication Data
US 2009/0138476 A1 May 28, 2009

Related U.S. Application Data

(63) Continuation of application No. 10/918,494, filed on Aug. 13, 2004, now Pat. No. 7,480,724, which is a continuation-in-part of application No. 10/254,183, filed on Sep. 25, 2002, now Pat. No. 7,584,263.

(51) Int. Cl.
*G06F 15/16* (2006.01)
(52) U.S. Cl. ........ 709/217; 709/203; 709/219; 709/220; 709/223
(58) Field of Classification Search ................. 709/204, 709/206, 207, 219, 220, 223, 203, 217
See application file for complete search history.

(56) References Cited

U.S. PATENT DOCUMENTS

| | | | |
|---|---|---|---|
| 5,224,098 A | 6/1993 | Bird et al. | |
| 5,708,780 A | 1/1998 | Levergood et al. | |
| 5,805,803 A | 9/1998 | Birrell et al. | |
| 5,913,210 A | 6/1999 | Call | |
| 5,964,830 A | 10/1999 | Durrett | |
| 5,983,227 A | 11/1999 | Nazem et al. | |
| 5,999,971 A | 12/1999 | Buckland | |
| 6,081,900 A | 6/2000 | Subramaniam et al. | |
| 6,151,624 A | 11/2000 | Teare et al. | |
| 6,223,177 B1 | 4/2001 | Tatham et al. | |
| 6,226,752 B1 | 5/2001 | Gupta et al. | |
| 6,286,039 B1 | 9/2001 | Van Horne et al. | |
| 6,327,628 B1 | 12/2001 | Anuff et al. | |
| 6,345,291 B2 | 2/2002 | Murphy et al. | |
| 6,381,579 B1 | 4/2002 | Gervais et al. | |
| 6,564,254 B1 | 5/2003 | Shoji et al. | |
| 6,567,122 B1 | 5/2003 | Anderson et al. | |
| 6,640,302 B1 | 10/2003 | Subramaniam et al. | |
| 6,643,652 B2 | 11/2003 | Helgeson et al. | |
| 6,643,683 B1 | 11/2003 | Drumm et al. | |
| 6,760,746 B1 | 7/2004 | Schneider | |
| 6,816,871 B2 | 11/2004 | Lee | |
| 6,839,680 B1 | 1/2005 | Liu et al. | |
| 6,937,842 B2 | 8/2005 | Uchimura et al. | |

(Continued)

OTHER PUBLICATIONS

"HomePortal Residental Gateways," www.2wire.com/home/hp_index.html, 2002 2Wire, Inc., pp. 1-3.

(Continued)

*Primary Examiner* — Michael Won
(74) *Attorney, Agent, or Firm* — Scott P. Zimmerman PLLC (57) ABSTRACT

Different communications devices, different communications networks, and/or different users are used to generate, enable, and/or manage an API tool set for providing services through a residential communications gateway. The actual physical location of the service and the manner in which it operates are transparent to the user.

19 Claims, 7 Drawing Sheets

U.S. PATENT DOCUMENTS

| | | | |
|---|---|---|---|
| 6,954,799 B2 | 10/2005 | Lerner | |
| 6,968,389 B1 | 11/2005 | Menditto et al. | |
| 7,013,289 B2 | 3/2006 | Horn et al. | |
| 7,120,632 B2 | 10/2006 | Helmbrecht et al. | |
| 7,124,188 B2 | 10/2006 | Mangipudi et al. | |
| 7,167,899 B2 | 1/2007 | Lee et al. | |
| 7,216,170 B2 * | 5/2007 | Ludvig et al. | 709/225 |
| 7,225,249 B1 | 5/2007 | Barry et al. | |
| 7,290,129 B2 | 10/2007 | Chebolu et al. | |
| 7,293,070 B2 * | 11/2007 | Moses et al. | 709/217 |
| 7,363,248 B2 * | 4/2008 | Rollins et al. | 705/26 |
| 7,480,724 B2 * | 1/2009 | Zimler et al. | 709/229 |
| 7,584,263 B1 | 9/2009 | Hicks | |
| 2001/0031456 A1 | 10/2001 | Cynaumon et al. | |
| 2002/0091836 A1 | 7/2002 | Moetteli | |
| 2002/0106071 A1 | 8/2002 | Uppaluru | |
| 2002/0152307 A1 | 10/2002 | Doyle et al. | |
| 2002/0188539 A1 | 12/2002 | Axelrad et al. | |
| 2002/0194267 A1 * | 12/2002 | Flesner et al. | 709/203 |
| 2003/0028599 A1 | 2/2003 | Kolsky | |
| 2003/0074342 A1 | 4/2003 | Curtis | |
| 2003/0078987 A1 | 4/2003 | Serebrennikov | |
| 2003/0177187 A1 | 9/2003 | Levine et al. | |
| 2004/0015563 A1 * | 1/2004 | Cotte | 709/218 |
| 2004/0078371 A1 * | 4/2004 | Worrall et al. | 707/9 |
| 2004/0128347 A1 * | 7/2004 | Mason et al. | 709/203 |
| 2004/0193513 A1 | 9/2004 | Pruss et al. | |
| 2005/0027887 A1 | 2/2005 | Zimler et al. | |
| 2005/0038869 A1 | 2/2005 | Zimler | |
| 2005/0091164 A1 | 4/2005 | Varble | |
| 2005/0183061 A1 | 8/2005 | Papanikolalou et al. | |
| 2006/0031407 A1 * | 2/2006 | Dispensa et al. | 709/219 |

OTHER PUBLICATIONS

"HomePortal 100 Residential Gateway," www.2wire.com/support/pdf/hp1100.pdf, 2000, 2Wire, Inc. pp. 1-2.

"Backup When Losing Data is Not an Option," www.backup.com/contact.html, pp. 1-2, Jun. 10, 2002.

"Backup When Losing Data is Not an Option," www.backup.com/product_info.html, pp. 1-3, Jun. 10, 2002.

"The Family Portal.Com," www.familyportal.com/vpdefault.gsp?s=Family, Vertical portals LLC, pp. 1-3, Jun. 10, 2002.

* cited by examiner

METHODS, SYSTEMS, AND PRODUCTS FOR MANAGING ACCESS TO APPLICATIONS

CROSS REFERENCE TO RELATED APPLICATIONS

This application is a continuation of U.S. application Ser. No. 10/918,494, filed Aug. 13, 2004, and now issued as U.S. Pat. No. 7,480,724, which is a continuation-in-part of U.S. application Ser. No. 10/254,183, filed Sep. 25, 2002 now U.S. Pat. No. 7,584,263, with both applications incorporated herein by reference in their entirety.

This application also relates to U.S. application Ser. No. 10/918,029, filed Aug. 13, 2004, and incorporated herein by reference in its entirety.

NOTICE OF COPYRIGHT PROTECTION

A portion of the disclosure of this patent document and its figures contain material subject to copyright protection. The copyright owner has no objection to the facsimile reproduction by anyone of the patent document or the patent disclosure, but otherwise reserves all copyrights whatsoever.

FIELD OF THE INVENTION

This invention generally relates to providing services to devices on heterogeneous networks. This invention more particularly relates to accessing services through a residential communications gateway and to all associated programming interfaces.

BACKGROUND

In November 2001, there were approximately 6.5 million residential networks in North America, and by 2006, that number is expected to grow to almost 30 million (Meeks, Fleming; *The Next Big Thing*; Barron's Online, Nov. 12, 2001). Families and other members of households use residential networks most often to share files, a printer, and/or an Internet connection. The needs of each computer user in the family, however, vary with age, interests, and level of comfort with the technology. Ideally, the network recognizes each member of the family/household as a different user with different preferences and provides helpful links especially for that user. Further, the administration of a network requires specific knowledge that a layperson does not have. Therefore, virtually all residential networks are and will be used by families who do not have the skill or knowledge to correct a problem when it arises. Moreover, families increasingly are saving important information onto their home computers, resulting in additional problems. For example, in order to protect against the loss of the information, the family must save a second copy in a different location. Also, occasionally families need to access the information when away from home or residence.

Conventional approaches to address these issues either are incomplete or require a confusing and often incompatible array of hardware and software. A router is one conventional solution to residential networking. A router, however, merely distributes an Internet connection to several computers, and does not provide personalized settings for different users. An Internet service provider (ISP), on the other hand, almost always allows each account to have several usernames with personalized settings, but in general the usernames are only related to separate email accounts. The services provided do not include that of helping users to maintain residential networks. While the Internet service is compatible with residential networks, the users must set up the networks themselves or have someone do it for them. Another existing solution that does not assist with network upkeep is a family-oriented website, sometimes called a portal, that provides links to other websites that might interest families. Such a portal is external to the residential network and consequently is not able to provide assistance with the network's operation. Finally, such a portal does not offer backup storage space. Data storage services are available on the Internet, but they are generally designed to backup residential computer systems. If a family chooses to use such a service for data storage, the family will have to solve the other issues of residential networking with different services that might not be compatible with the data storage solution and may be difficult to manage.

One conventional approach is to use a router to connect several home computers to one Internet connection. The router may come with software that provides a starting page for browsing the Internet. Often, the starting page is linked to the website of the company that produces the router, and sometimes that website provides data storage space. For example, 2Wire (2Wire, Inc., 1704 Automation Parkway, San Jose, Calif. 95131, 408-428-9500) produces Home Portal™, a router that allows the user to connect computers using phone lines, Ethernet cables, USB connections, or wireless signals. The user loads the included software onto each computer to be connected to the network, and that software provides a beginning screen each time a user wants to access the Internet. The disadvantage of this beginning page is that it is the same on all machines. This is not ideal because children often have different interests than their parents, particularly with regards to content on the Internet. For example, a link to stock market reports usually is not useful to a child, and a link to a chat room usually is not useful to a parent. In most cases, the default homepage for a router is the user configuration page for the router. It is generally specific to the router. This web server is hosted on the router and not in the general Internet. On the other hand, a "portal" is defined traditionally as a web service that is established on the internet, providing user specific details as per the users portal configuration. In the concept, a smart or "home" portal is hosted on the home router and provides user specific content based on content that is pushed to the router based on a user's preference model.

Another approach to family Internet use is to choose an Internet service provider (ISP) that allows each account to have several different usernames. Then, member of the family/household can be given a username, and consequently each member will receive more personalized attention. For example, America Online, (America Online, Inc., Dulles, Va.) allows each account to have several different screen names and/or user identities. After a particular user enters a screen name to access the Internet, a beginning page with personalized settings appears. This service is comprehensive for users with only one computer but not for multiple users with multiple computers on a network. Still another weakness of this approach is that although this service limited compatibility with a residential network, it also does not provide assistance in creating or maintaining that network. As a result, the family must either manage the network or procure management services from another entity.

Certain websites, sometimes called portals, exist to provide useful links to a specific group of people. Portals can contain links that are appropriate for families. An example of such a website is The Family Portal at www.familyportal.com. This website provides links to topics that might interest families, but these listings are not personalized for each user.

In addition, the website is completely external to the residential network and consequently does not assist in the residential network's creation or maintenance. Finally, the website does not offer backup storage space to the users. Therefore, this website is not a comprehensive solution to the needs of a family of Internet users.

A similarly incomplete solution is a website dedicated solely to data storage. While useful for its limited purpose, it requires the user to find other Internet and networking services elsewhere. For example, backup.com, a service of SkyDesk.com (12348 High Bluff Drive, Suite 200, San Diego, Calif. 92130, 858-720-4400), provides storage space for backup copies of files. After the user subscribes to the service, the user can upload copies of files onto the backup.com website, where they will be stored in case the original files are lost. Aside from data storage and transfer services, however, backup.com does not have any services for a residential network. Moreover, backup.com is not designed to be a link to other sites; therefore, it is not a convenient place for a family to begin browsing the Internet. Also, if an Internet-based datastorage business fails, the subscriber may have difficulty retrieving backed up files.

The current state of residential network services clearly indicates that a comprehensive system for networking home computers and other devices, providing Internet access and residential network access with personalized settings for multiple users, and providing storage space for backup copies of files is needed. Further, there is a need for efficient, personalized interfaces that allow the customer (or authorized user) to manage and control of applications used and/or accessed by the network.

SUMMARY

This invention provides systems and methods for managing and/or otherwise controlling a broad array of services through a residential communications gateway connecting multiple communications devices and multiple users. According to exemplary embodiments of this invention, a system for providing services includes a residential network in communication with a service provider network (or alternate third party communications network) through a residential communications gateway. For example, the service provider network may be a telecommunications provider, an Internet Service Provider (ISP), a cable system operator, and/or a data network. A communications device communicates, either directly or indirectly, with the residential communications gateway executing on a portal. The portal includes a plurality of links including a link to at least one first application on the residential network and to at least a single second application on the service provider network. To control access, provide flexibility, and enable a distributed residential network, the system also includes a data store, such as a database, for storing records related to the services, subscribers (e.g., individual responsible for payment of a bill for the service), and/or users associated with each subscriber's residence. According to other embodiments of this invention, an application programming interface manages and associates each user of the communications device in the residential network with at least one available application on the residential network and with at least one available application on the service provider network. Still in further embodiments, an application services gateway interacts with the application programming interface to execute the applications necessary for providing a service to the communications device. In general the Application Programming Interface ("API") provides an interface whereby a computer program or multiple computer programs are written to manage the user experience, the residential gateway ("RG"), and/or Application Services Gateway(s) ("ASG").

According to other exemplary embodiments, this invention comprises methods, systems, and apparatus that provide an Application Programming Interface (API) that are controlled by a "backend" management system on behalf of a subscriber making requests by and not limited to a standard web interface for a typical family portal experience. The API embodies a set of control and command options permitting the control of a data source, such as a database, for storing records associated with the services and with the users.

In an embodiment of this invention, a user uses a communications device to access a service. The communications device may comprise any device capable of presenting a user interface, including communications devices capable of displaying visual communications including text, pictures, and other visual material and presenting audio communications including voice, dual tone multi frequency, and other audio communications. A service application may execute on a communications device in the home/residence (e.g., also referred to herein as the "residential address") or outside the home. In either case, the application executes on a device that includes some type of processor and a means for communicating with the residential network and/or residential communications gateway.

Any type of application that would be valuable to members of a home or residence may be provided by an embodiment of this invention. For example, an embodiment may include applications, such as a calendar, a bulletin board, a to-do list, unified messaging, and/or a directory. In addition, applications such as, for example, home security, HVAC control, lighting control, audio distribution, and/or multimedia-ondemand may prove valuable to a user of this invention.

In a method according to an exemplary embodiment of this invention, a computer program executing on a processor, such as a web server, identifies a first application capable of execution within the home and determines the address and/or other method for accessing the application. The web server then creates an HTML portal page that includes a link to the application. The web server also includes a second link to a second application that executes outside the home. Since the portal may be provided as an HTML page, the subscriber may access the page from either a communications device in the home or a communications device outside the home that is in communication with the provider network.

Attributes for the services, the subscriber, and other relative components of an embodiment of this invention may be stored in a database. The database is in communication with the residential communications gateway and may be present in the residential network, the provider network, and/or multiple databases may be stored in both. An embodiment includes a mechanism to identify each individual user and to differentiate service offerings for each identified user.

Exemplary embodiments of this invention may include computer programs encoded on computer-readable medium, such as volatile and non-volatile storage devices. The computer program code may include scripts, object-oriented components, and/or other types of executable code combined with static elements, such as, for example HTML or extensible markup language (XML) pages and style sheets (XSLT).

Exemplary embodiments of this invention provide numerous advantages over conventional systems and methods. For example, some embodiments of this invention provide a means to integrate the variety of services accessed by the family/household and further provide various mechanisms for controlling access, sharing, executing, storing, and/or otherwise managing the services, such as, for example, parental control of children's access to various content. By treating the family as an organizational unit, an embodiment of this invention provides the service provider with an opportunity to differentiate a service offering according to this invention from service offerings provided by the service provider's competitors.

Also, according to exemplary embodiments of this invention, the management of as well as the location of services are transparent to the user. The service provider performs analysis and makes decisions regarding where particular services should be located, where they should execute, and/or how the subscriber and/or user should access the available services. The service provider can then install or assist in installation of the necessary packages and thereafter, create and manage entries in the service database so that each user of a subscribing home can access the service.

Further details on these embodiments and other possible embodiments of this invention are set forth below. As is appreciated by those of ordinary skill in the art, this invention has wide utility in a number of areas as illustrated by the discussion below. These embodiments may be accomplished singularly, or in combination, in one or more of the implementations of this invention.

BRIEF DESCRIPTION OF THE FIGURES

The above and other embodiments, objects, uses, advantages, and novel features of this invention are more clearly understood by reference to the following description taken in connection with the accompanying figures, wherein.

DETAILED DESCRIPTION

This invention now will be described more fully hereinafter with reference to the accompanying drawings, in which exemplary embodiments are shown. This invention may, however, be embodied in many different forms and should not be construed as limited to the embodiments set forth herein; rather, these embodiments are provided so that this disclosure will be thorough and complete, and will fully convey the scope of the invention to those of ordinary skill in the art. Moreover, all statements herein reciting embodiments of the invention, as well as specific examples thereof, are intended to encompass both structural and functional equivalents thereof. Additionally, it is intended that such equivalents include both currently known equivalents as well as equivalents developed in the future (i.e., any elements developed that perform the same function, regardless of structure).

Thus, for example, it will be appreciated by those of ordinary skill in the art that the diagrams, schematics, flowcharts, and the like represent conceptual views or processes illustrating systems and methods embodying this invention. The functions of the various elements shown in the figures may be provided through the use of dedicated hardware as well as hardware capable of executing associated software. Similarly, any switches shown in the figures are conceptual only. Their function may be carried out through the operation of program logic, through dedicated logic, through the interaction of program control and dedicated logic, or even manually, the particular technique being selectable by the entity implementing this invention. Those of ordinary skill in the art further understand that the exemplary hardware, software, processes, methods, and/or operating systems described herein are for illustrative purposes and, thus, are not intended to be limited to any particular named manufacturer.

As used herein, the term "communications device" includes wired and wireless communications devices, such as a Plain Old Telephone (POTs) phone, a mobile phone, a wireless phone, a Wide Area Protocol (WAP) phone, a satellite phone, a computer, a modem, a pager, a digital music device, a digital recording device, a personal digital assistant, an interactive television, a digital signal processor, and a Global Positioning System device. Further, as used herein, the term "data" includes electronic information, such as, for example facsimile, electronic mail (e-mail), text, video, audio, and/or voice in a variety of formats, such as dual tone multi-frequency, digital, analog, and/or others. Additionally, the data may include: (1) executable programs, such as a software application, (2) an address, location, and/or other identifier of the storage location for the data, (3) integrated or otherwise combined files, such as a grouping of destination communications addresses associated with a receiving party, and/or (4) one or more user profiles associated with an Application Programming Interface (API) of this invention. In various embodiments, the data may be stored by a communications network, a peripheral storage device connected to a communications network, other connected networks, and/or a communications device.

According to exemplary embodiments, methods and systems of this invention generate, enable, and/or otherwise manage an application programming interface (API) that seamlessly integrates different communications devices, different communications networks, and/or different users to provide services through a residential communications gateway. According to exemplary embodiments of this invention, the application programming interface provides a mechanism for accessing a variety of services, such as applications controlling of device and/or residential system that make up a residential network for a home (also referred to herein as a "residential address") and such as applications for a variety of services (e.g., electronic organizer, electronic messaging, word processing, financial management and payment systems, and so on) available in a provider network. A subscriber registers at least one communications device associated with a residential network for a particular service and is then provided access to that service from the provider network. Further, the subscriber then establishes the privileges for each other user of the residential network. The subscriber (or some other authorized individual) acts as an "administrator" for the other users of the residential network. This "administrator" registers each user for an appropriate service for that user to access from the provider network and/or from the home network. The subscribing administrator may thus establish individual privileges for services and for communications devices. For example, the administrating subscriber may be the head of the household and register a landline phone of the residential address, a first cellular phone of a family member, a second cellular phone of another family or household member, a home computer, and/or an interactive pager of yet another family or household member. Each user of each communications device may be registered for an available service, such as text messaging over the provider's network. For example, a first user of the landline phone may call an access number (e.g., toll-free number, local access number, and so on) to logon to the provider network, enter a user identification and a password, and then retrieve a converted voice message (i.e., the provider network converts the text message to a voice message) left for that user and have the converted voice message played over the landline phone. Still another example is a home or residential computer that allows multiple users in the home to logon to the subscriber network and access services available for each user as well as access residential services (e.g., access an application that controls home security systems). However, each user may be set up to access selected services for each registered communications device. That is, the user may be able to access video-on-demand services to the home computer, but not access these services on a remote computer (e.g., computer located remotely from the residential address). Further, the actual physical location of the service and the manner in which it operates are transparent to the user.

Figure 1:
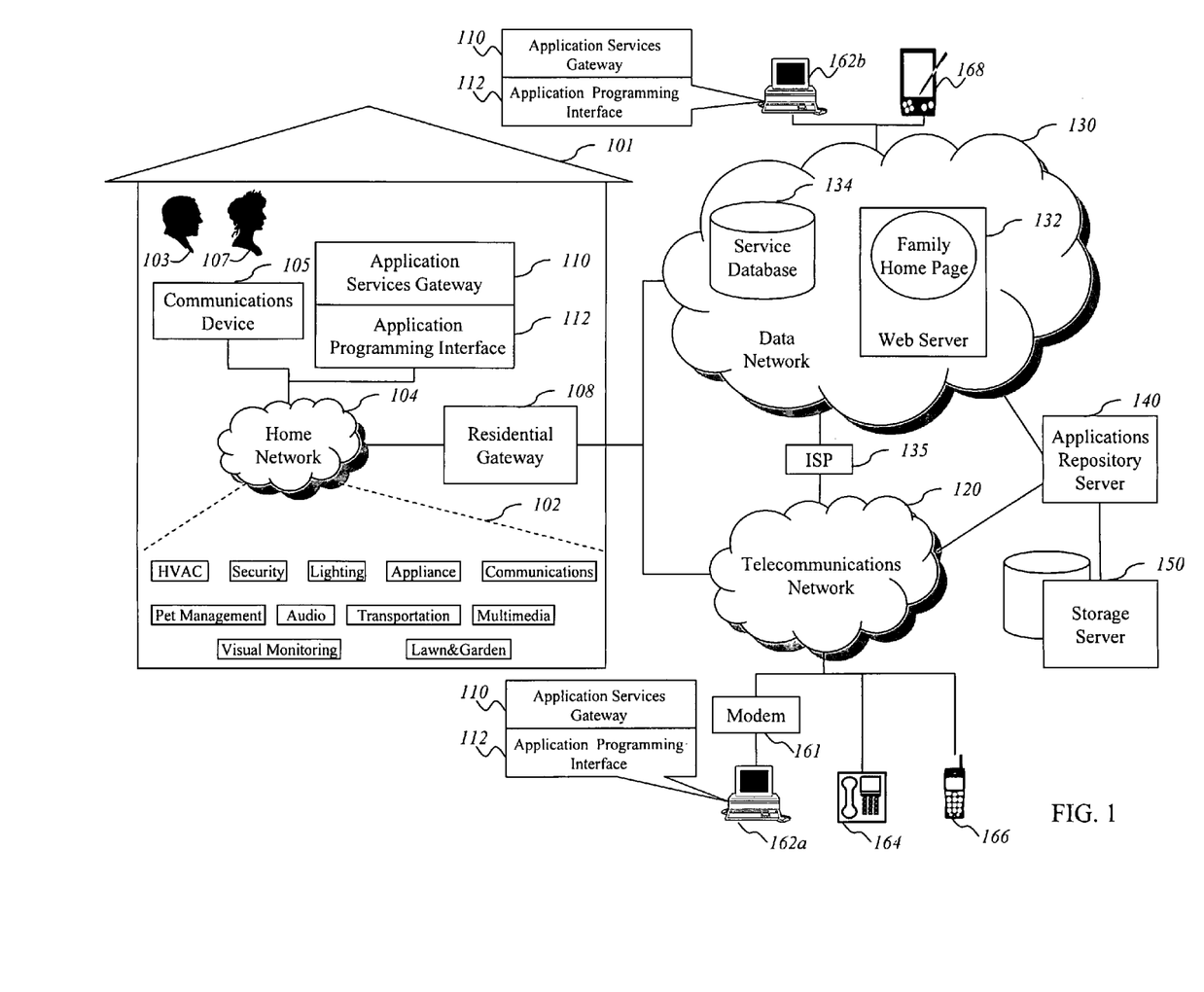
FIG. 1 is a block diagram illustrating an operating environment according to exemplary embodiments of this invention.

Referring now to the drawings in which like numerals indicate like elements throughout the several Figures, FIG. 1 illustrates an exemplary environment for operation of embodiments of this invention. The embodiments shown include a residential address 101, a plurality of residential application services 102, a communications device 105 located within the residential address 101 that interfaces with an application services gateway 110 and an application programming interface 112, a first user 103, a second user 107, a home network 104, a residential gateway 108 interfacing with a plurality of external communications networks, shown as telecommunications network 120 and data network 130, and a plurality of external communications devices, shown as a modem 161 and a computer 162a, another computer 162b, a telephone 164, a cellular phone 166, and a personal digital assistant (PDA). The external communications networks 120, 130 communicate with an applications repository server 140 and a storage server 150. Further, the telecommunications network 120 and the data network 130 may communicate with each other via a connection provided by an Internet Service Provider (ISP), such as America Online, or alternatively, may communicate through a gateway (not shown). Still further, the data network 130 includes a service database 134 and a web server having a family home page 132. Alternatively, the service database 134 may be located within the telecommunications network 120, within another communications network, and/or may be a stand alone component. An embodiment of this invention works to enable the family or household as an organizational unit.

The residential network 104 communicates with the external communications networks 120, 130 through the residential communications gateway 108. The residential communications gateway 108 includes various components to facilitate networking. For example, in an embodiment utilizing a digital subscriber line (DSL) connection, residential communications gateway 108 may include a DSL modem, firewall software, and/or a router. The residential communications gateway 108 also includes wide area networking features to allow a user to access components of the residential network 104 from outside the home 101.

According to an exemplary embodiment, the application services gateway 110 facilitates execution of one or more residential service applications 102 to the communications device 105 and also facilitates execution of one or more external service applications available via the service database 134, the storage server 150, third-party application providers (not shown), and/or external communications devices, such as, for example computers 162a and 162b. The applications that execute on the applications services gateway 110 are available to a communications device that operates both inside the home 101 (such as communications device 105) and that operates from outside the home 101 (such as computer 162b). The residential service applications 102 may include applications that control residential systems, such as, a home security application, an HVAC control application, a lighting control application, an audio distribution application, a multimedia-on-demand application, an appliance application, a lawn and garden management application, a communications application, a transportation vehicle management application, a visual monitoring application, and/or a pet management application. The external services applications may include a variety of applications, such as, for example services that may be offered by a telecommunications provider of the telecommunications network 120 (e.g., voice messaging), applications available over the data network, applications running on external communications device, third-party applications (e.g., electronic games, movies, etc.), and/or applications stored in on offsite services database, such as service database 134. Some further examples of external service applications include, bur are not limited to applications for an electronic calendar, a voice messaging application, a text messaging application, a video messaging application, a digital communications application, an electronic to-do list, an electronic directory, a word procession application, a spreadsheet application, a presentation application, a medical application, a research application, and a billing application.

The residential communications gateway 108 of the embodiment shown connects to the telecommunications network 120 and/or to the data network 130. The telecommunications network 120 may include a telecommunications network such as, for example, a public switched telephone network (PSTN), a mobile switching telephone communications network (MSTO), a satellite communications network, and/or other networks. For example, in an embodiment in which the telecommunications network 120 includes a DSL network, the residential communications gateway 108 may include a DSL modem (not shown) and connect to a digital subscriber line access multiplexer (DSLAM) in a central office (not shown) of the telecommunications network 120 via a local telephone loop. According to other embodiments, the telecommunications network 120 may be operated by a regional bell operating company. The telecommunications provider performs various tasks, including downloading applications, updating applications and data, maintaining control programs, and allowing third-party access to services within and/or services managed or otherwise controlled by the telecommunications network 120. Still further, the data network 130 may include a world wide electronic data communications network, such as an Intranet, Internet, and/or Extranet. And, still in further embodiments, this invention may use a hybrid network, such as if the communications device 105 is embodied as a Voice over Internet Protocol (VoIP) communications device that communicates with both the telecommunications network 120 and the data network 130

Also in communication with the residential network 104 and the telecommunications network 120 is a web server 132 having a family/household home page and a services database 134. The web server 132 responds to requests, such as hypertext transfer protocol (HTTP) requests, with documents, such as hypertext markup language (HTML) documents. Further, the service database 134 may be an Oracle, Microsoft SQL Server, or other database that stores information necessary to provide services to a user. The web server 132 may also provide applications executing under a common gateway interface (CGI), Microsoft Active Server Pages (ASP), or other environment. The web server 132 may include various applications, such as a portal service.

In an exemplary embodiment of this invention, the subscriber may use a variety of means to access services provided by the residential communications gateway 108, such as using a variety of communications devices 105, including a POTS phone, a mobile phone, a wireless phone, a WAP phone, a satellite phone, a computer, a modem, a pager, a digital music device, a digital recording device, a personal digital assistant, an interactive television, a digital signal processor, and/or a Global Positioning System device, to access one or more of the home network 104, the telecommunications network 120, the data network 130, and/or a third party network. Further, the application programming interface (API) 112 controls and manages each user's communications with the networks and to available applications. That is, API 112 controls the available applications to a communications device 105 for the first user 103 and controls the available applications to the same communications device 105 for the second user 107, so that each user has a personalized residential portal over the residential network 104, the telecommunications network 120, the data network 130, and/or a third party network.

Figure 2:
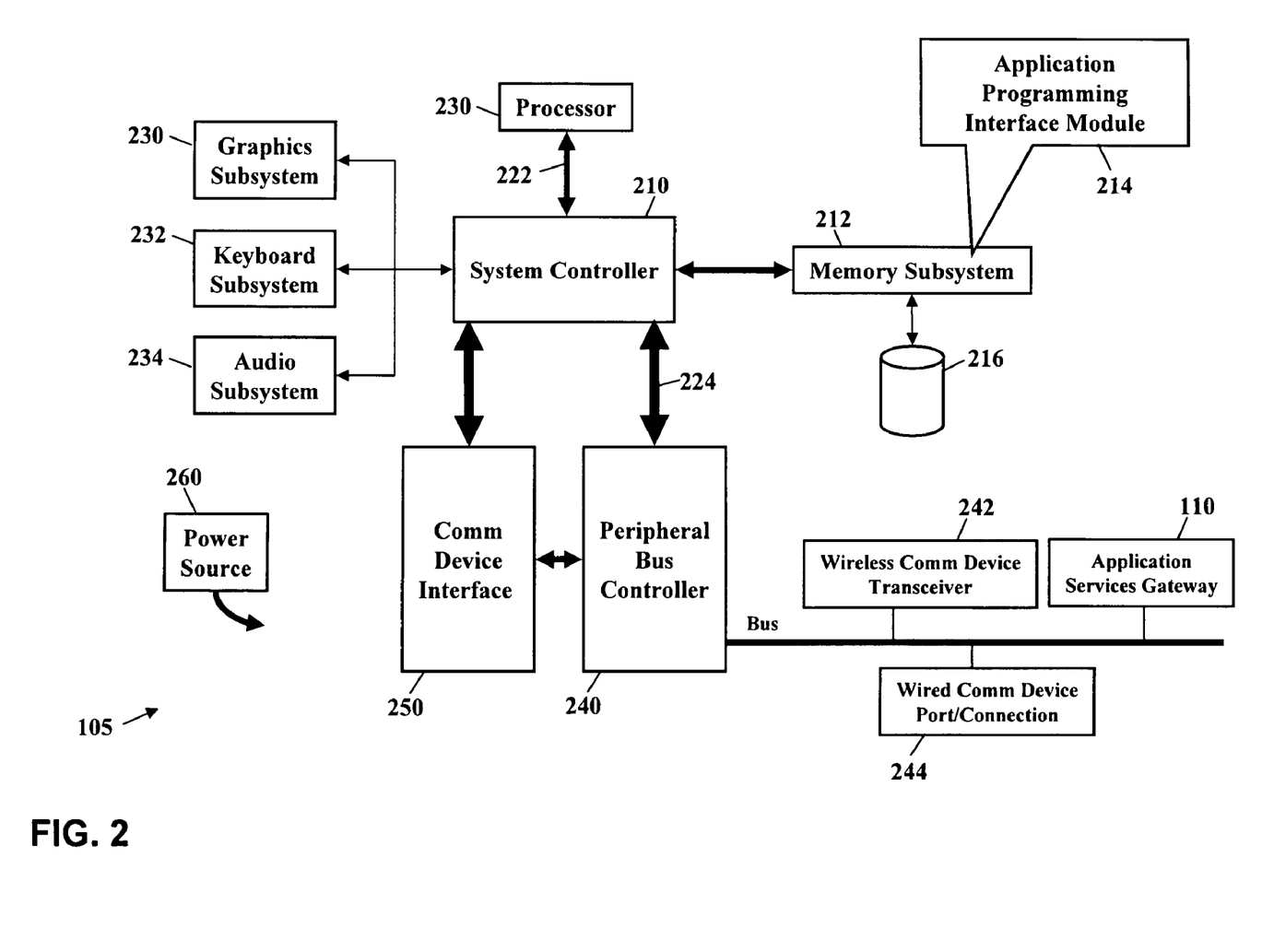
FIG. 2 is a block diagram of an Application Programming Interface Module residing in a communications device according to exemplary embodiments of this invention.

FIG. 2 is a block diagram showing an Application Programming Interface Module 214 that operates within a system memory device 212 of a communications device 105 according to an exemplary embodiment. The Application Programming Interface Module 214, however, could also reside in flash memory, a peripheral storage device 216, and/or an alternate communications device (such as, for example, computers 162a, 162b, cellular phone 166, and PDA 168). As illustrated, the communications device 105 also includes and/or interfaces with one or more central processors 220 executing an operating system. The operating system, as is well known, has a set of instructions that control the internal functions of the communications device 105. A system bus 222 communicates signals, such as data signals, control signals, and address signals, between the central processor(s) 220 and a system controller 210. The system controller 210 provides a bridging function between the memory subsystem 212, the one or more central processors 220, a graphics subsystem 230, a keyboard subsystem 232, an audio subsystem 234, a PCI (Peripheral Controller Interface) bus 224, and a Communications ("Comm") Device Interface 250. The PCI bus 224 is controlled by a Peripheral Bus Controller 240. The Peripheral Bus Controller 240 is an integrated circuit that serves as an input/output hub for various peripheral ports and/or transceivers. These peripheral ports allow the communications device 105 to communicate with a variety of other communications devices through networking ports (such as SCSI or Ethernet) that include Wireless Communications ("Comm") Device Transceiver 242 (such as Wireless 802.11 and Infrared) and Wired Communications ("Comm") Device Port/Connection 244 (such as modem V90+ and compact flash slots) and to communicate with the applications service gateway 110 to execute the available applications. These peripheral ports could also include other networking ports, such as, a serial port (not shown) and/or a parallel port (not shown). The Comm Device Interface 250 allows the communications device 105 to monitor, detect, receive, and decode incoming communications signals to the communications device(s) connected to the Wireless Comm Device Transceiver 242 and/or the Wired Comm Device Port/Connection 244. Further, the Comm Device Interface 250 communicates and/or transmits communications signals to the Wireless Comm Device Transceiver 242 and/or the Wired Comm Device Port/Connection 244. Still further, the communications device 105 may include a power source 260, such as a rechargeable battery to provide power and allow the communications device 105 to be portable. In alternate embodiments, the communications device 105 could include its own telephone line (or other communications connection) to the home network 104 and/or to the telecommunications network 120.

The system memory device (shown as memory subsystem 212 or peripheral storage device 216) may also contain one or more application programs. For example, an application program may cooperate with the operating system and with a video display unit (via graphics subsystem 230) to provide a GUI for the Application Programming Interface Module 214. The GUI typically includes a combination of signals communicating with the graphics subsystem 230 and/or the keyboard subsystem 232. The GUI provides a convenient visual and/or audible interface with the user of the communications device 105. As is apparent to those of ordinary skill in the art, the user (e.g., receiving party, calling party, and/or administrator) interacts with the Application Programming Interface Module 214 over a variety of mediums, such as, for example, a stylus, keyboard, and punch buttons of the keyboard subsystem 232, a display screen of the graphics subsystem 230, and/or a voice-activated menu prompt of the audio subsystem 234.

According to exemplary embodiments of this invention, the API Module 214 includes information needed to customize the availability and access of each user 103, 105 for each associated communications device (e.g., 105, 162a, 162b, 164, 166, and/or 168) for each of the network (e.g., 104, 120, 130). For example, the subscribing customer may be identified as the primary customer account, and that account is associated with the personal name and/or other identifiers of the primary customer for the portal service, such as, account number, user code, last name, first name, middle name, and/or title. Further, the primary customer account specifies the residential network 104 with the personal residential address information related to the primary account holder for the portal service, such as, street address, other address, city, state, and zip code. Still further, the primary customer billing information includes related billing information for the primary subscriber, such as account number, telephone number, billing strategy, billing amount, and billing date information. For each user other than the primary customer, the API includes personalized information for each user that typically includes the secondary user's name (that may be identified by the primary account holder as an authorized user of the portal, such as a family member), account number, user code, and/or available services for that user via the portal.

Figure 3:
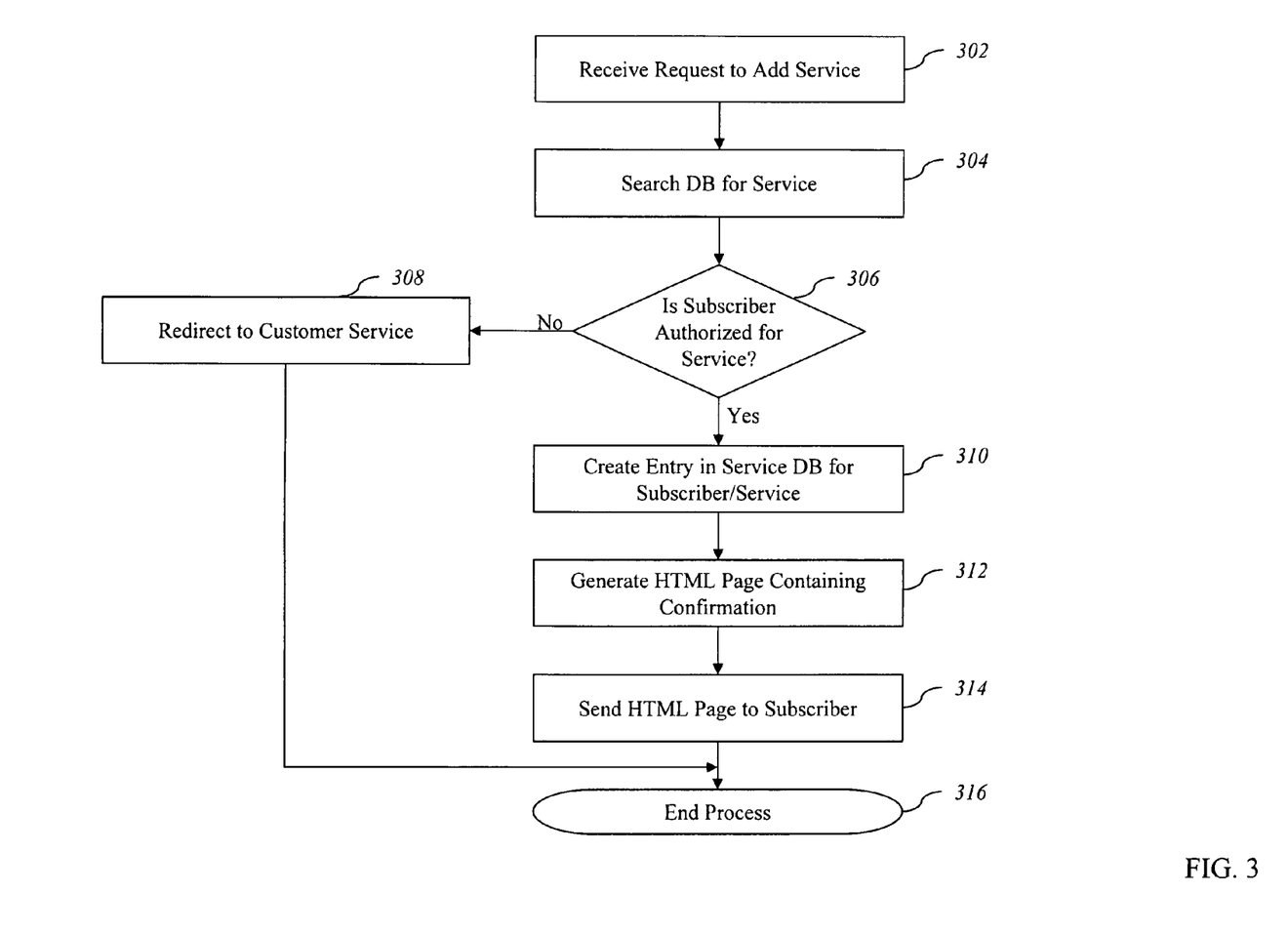
FIG. 3 is a flow chart illustrating the process of requesting a service according to exemplary embodiments of this invention.

FIG. 3 illustrates a process of requesting a service according to exemplary embodiments of this invention. Requesting a service, which is also referred to as registering for a service, may entail calling a service representative, mailing in a subscription form, or filling out a form via a web server, such as web server. In the process shown, a telecommunications service provider (also referred to as a service provider) receives a request from a user to add a service 302 on web server. For example, the user may wish to take advantage of a backup service. In response to receiving the request, a program executing on the web server searches the service database 304 for services that the user has registered for or that the user is authorized to use. The services database 134 may alternatively communicate with communications device sending the request and, thus, not necessitate the web server. Using the retrieved data, the web server next determines whether or not the subscriber is authorized for the requested service 306. In the embodiment shown, if the program executing on the web server determines that the subscriber does not have authorization, the web server redirects the subscriber's request to, for example, customer service 308. A customer service representative or automated program may then provide instructions to the subscriber for gaining access.

Alternatively, the subscriber may designate a destination for unauthorized service requests to be redirected. For example, a subscriber may designate certain adult-oriented services as blocked from particular members of the subscriber's family. The subscriber may further designate a page, explaining these limitations, as the destination for requests that the web server determines are not authorized to access the blocked sites. When the members of the family that are not authorized to access the service attempt to access the service, the web server redirects the request to the designated page.

If the subscriber is authorized for the service, the web server creates an entry in the service database for the subscriber, service combination 310. For example, if a subscriber's child wishes to access a backup service, the web server searches the service database to determine whether the subscriber has put any limits on access to the backup service. If the subscriber has not limited access to the service, and there are no other limitations on who may access the service, the web server creates an entry linking the service with the user so that a link to the service appears on the user's portal page.

Referring again to FIG. 3, the web server next generates an HTML page containing a confirmation of the service addition 312. The HTML page may contain additional information, including any service usage instructions or other pertinent information. The web server next sends the HTML page to the subscriber 314, and the process ends 316.

Figure 4:
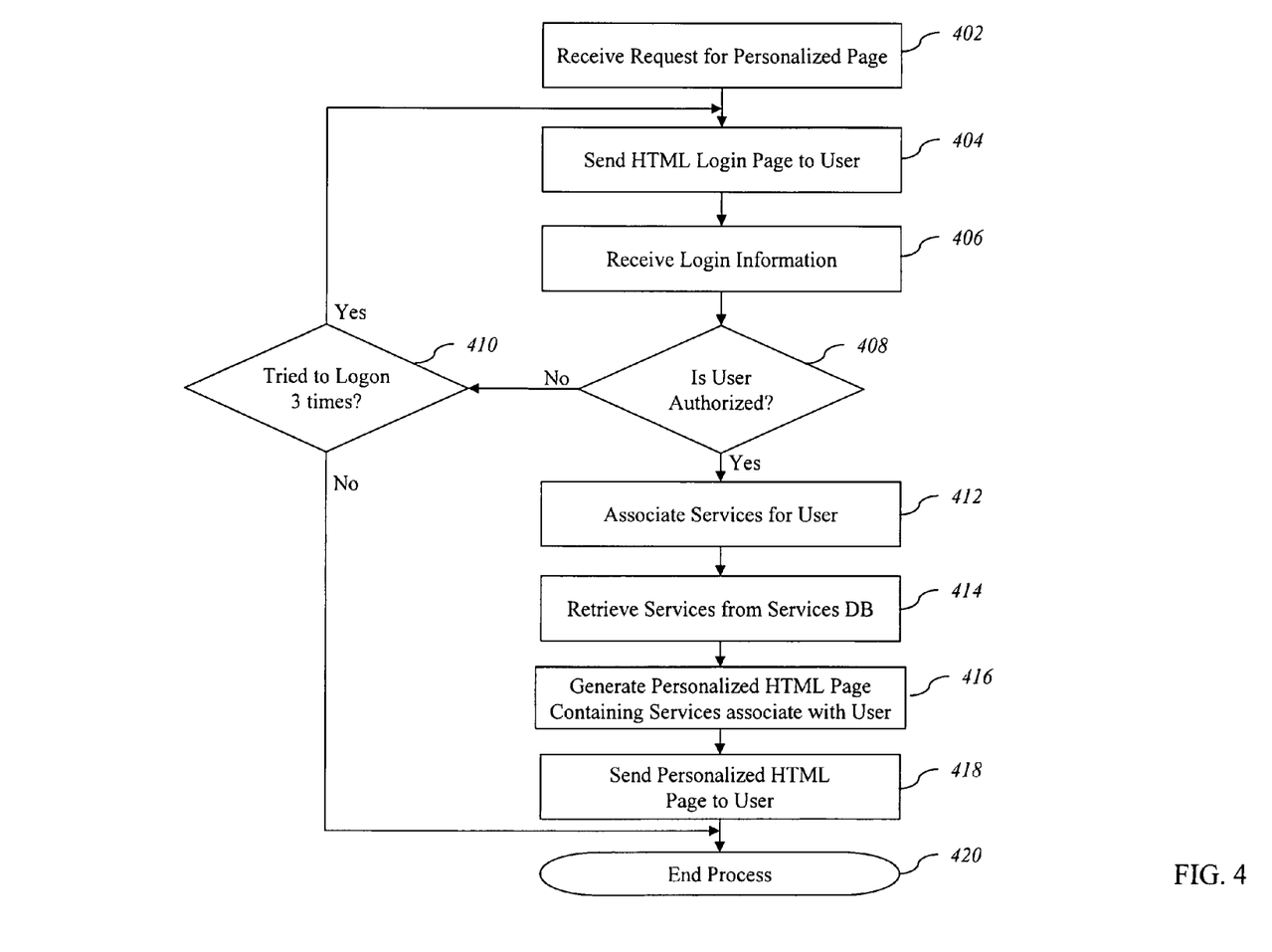
FIG. 4 is a flow chart illustrating a process of providing a personalized page to a user according to exemplary embodiments of this invention.

FIG. 4 is a flow chart, which illustrates a process of providing a personalized page to a user according to exemplary embodiments of this invention. In the process shown, the web server receives a request for a personalized page from the user 402. A personalized page contains links and other content previously specified by the subscriber during a registration or other process or set up as default content by the service provider. In response to the request, the web server sends an HTML page containing a login form to the subscriber via the residential communications gateway 404. The subscriber fills in the login information and submits the form to the web server. The web server receives the login information 406. In other embodiments, the login process is automated. In such an embodiment, the web server sends the HTML page with the login as illustrated, and an automated process executing on the residential communications gateway or other processor within the home responds by sending the login information to the web server. For example, the username and password may exist in a cookie. The residential communications gateway uses the cookie to provide the login information.

The web server verifies that the subscriber is authorized to access the personalized page 408. If the authorization fails, the web server allows two additional attempts 410. If the three attempts fail, the process ends 418. If the authorization is successful, the web server retrieves service information for the subscriber from the service database 412. In an embodiment of this invention, the service information includes a variety of individual data elements. These data elements identify the service type, where the service executes, and additional parameters necessary to provide the service to the subscriber. For example, in one embodiment of this invention, the service database includes a uniform resource locator pointing to a family calendar web site on the web server. In another embodiment, the service database includes a reference to a backup program that is installed on each computer in the home 101 and is operable for backing up data from the computers to a data storage device associated with the provider network.

The web server utilizes the service information to generate an HTML page, which contains links to the various services available to the user 414, and more specifically, available to the member of the subscriber's family (e.g., second user) who is currently and/or simultaneously logged in. The web server then sends the resultant HTML page to the user 416. The process then ends 418.

Figure 5:
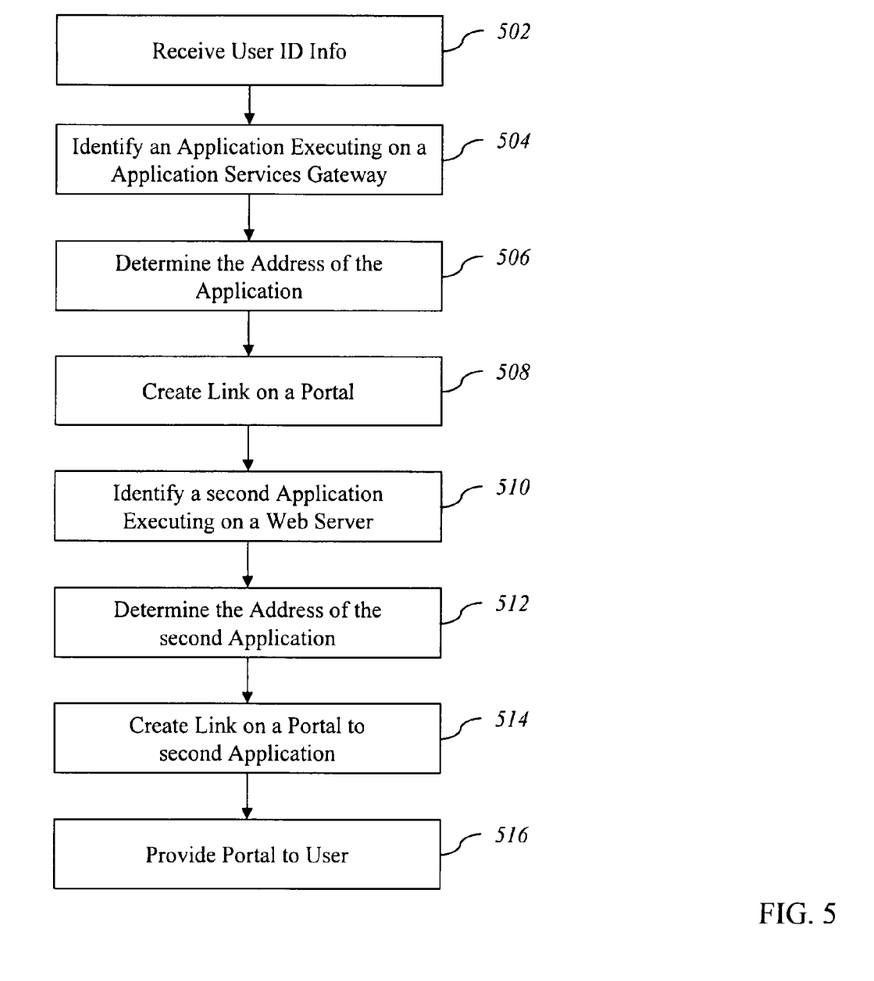
FIG. 5 is a flow chart illustrating another process of providing a personalized page to a user according to exemplary embodiments of this invention.

FIG. 5 is a flow chart illustrating exemplary embodiments of this invention for processing user identification information to create the personalized portal for the user. In the process shown, the web server receives user identification information, such as a username/password combination 502. In response, the web server searches the database and identifies an application that executes on the residential communications gateway in the home 504. The actual executable code may reside elsewhere in the residential network or the provider network, however, the code executes on the processor on the residential communications gateway. The web server next determines the address of the application based on the data retrieved from the database 506. For example, the data retrieved from the database may include the Internet protocol (IP) address of the residential communications gateway as well as an executable name. Alternatively, the residential communications gateway may include web server software. In that case, the data may include the IP address and a web location in the form of a uniform resource locator (URL). For example, in one embodiment the residential communications gateway is a dynamic host configuration protocol (DHCP) server to computers within the home and a DHCP client to the provider network. In such an embodiment, the residential communications gateway has an internal address, such as 192.168.0.1, in the internal network. The service database includes the internal address and the name of the web site, for example, 192.168.0.1\WebSiteName. The web server includes a program, such as an ASP program, that creates a portal page. When the web server retrieves the information about the application that executes on the residential communications gateway, the web server creates a link on the portal page that links to the web site on the residential communications gateway 508.

The web server may identify multiple applications to which the user has access. In the embodiment shown, the web server identifies a second application that executes on the web server itself 510. The web server determines the address (of itself) from the data retrieved from the database 512 and creates a link to the address on the portal page 514. The web server then provides the portal to the user via the residential communications gateway 516.

According to exemplary embodiments of this invention, once the user is presented with the web page containing links to services, the user accesses those services. The services may execute on any of the various available platforms illustrated in FIG. 1. Execution of a service may occur on multiple components and may vary over time. For example, a service for providing the user with a way to organize contacts, including names, addresses, and phone numbers, may include a database and a user interface executing on the application services gateway 110. Later, the service provider may determine that it is more efficient to save all subscribers' databases of contacts on a database within the telecommunications network 120 but continue to execute the application programming interface 112 and the application services gateway 110 to ensure acceptable response times. The provider can accomplish the movement of the application and corresponding references to the application in a number of ways. For example, the provider can manually change the links on various web pages to point to the relocated database. Alternatively, the service provider may create a database of services, such as service database 134, which allows the provider to simply make changes to records in the database when the location or operation of a service is changed.

Figure 6:
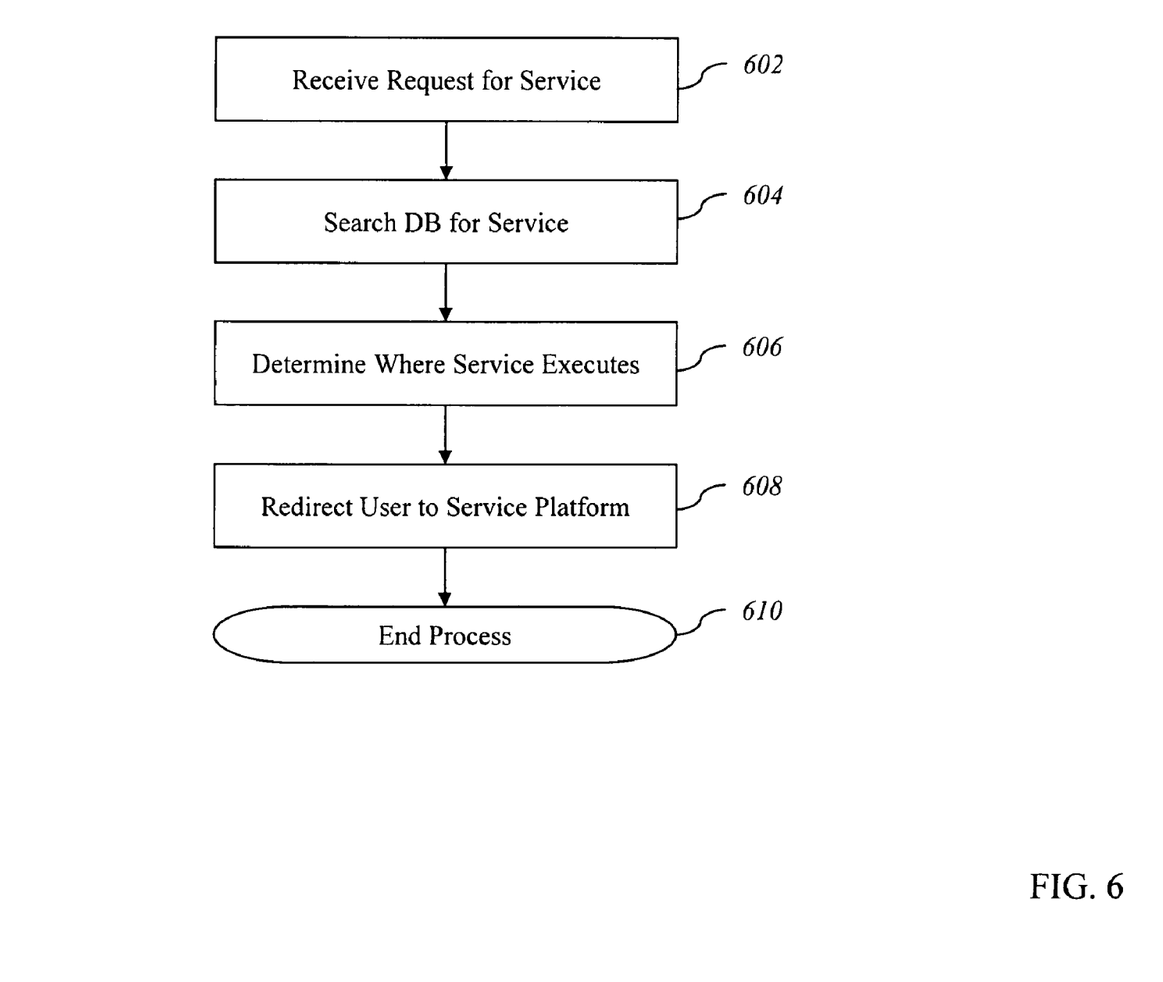
FIG. 6 is a flow chart illustrating a process for responding to requests for services from a user according to exemplary embodiments of this invention.

FIG. 6 is a flow chart illustrating a process for responding to requests for services from a user according to an exemplary embodiment. The process illustrated by FIG. 6 may be carried out on any of the computer platforms illustrated in FIG. 1. In one embodiment, the residential communications gateway 108 executes the process. When the user views the HTML page that contains links to services, the user selects a service by clicking on the corresponding hyperlink. As a result of the user's selection, the residential communications gateway receives a request for service from the user via a communications device [block 602]. The residential communications gateway searches an internal or external database for the entry corresponding to the user's request [block 604]. The database returns a record that contains information related to the service. Using this record, the residential communications gateway determines on which platform the application is stored and/or executes [block 606]. For example, the record may contain the IP address or server name and the name of an executable or other program file. The residential communications gateway utilizes this information to redirect the user's request for service to the platform that provides the service [block 608]. Since the application may reside and/or execute on the residential communications gateway itself, redirection also encompasses handling the request via an executable on the same machine that receives the request. Once the user's request has been redirected, the process ends [block 610].

Figure 7:
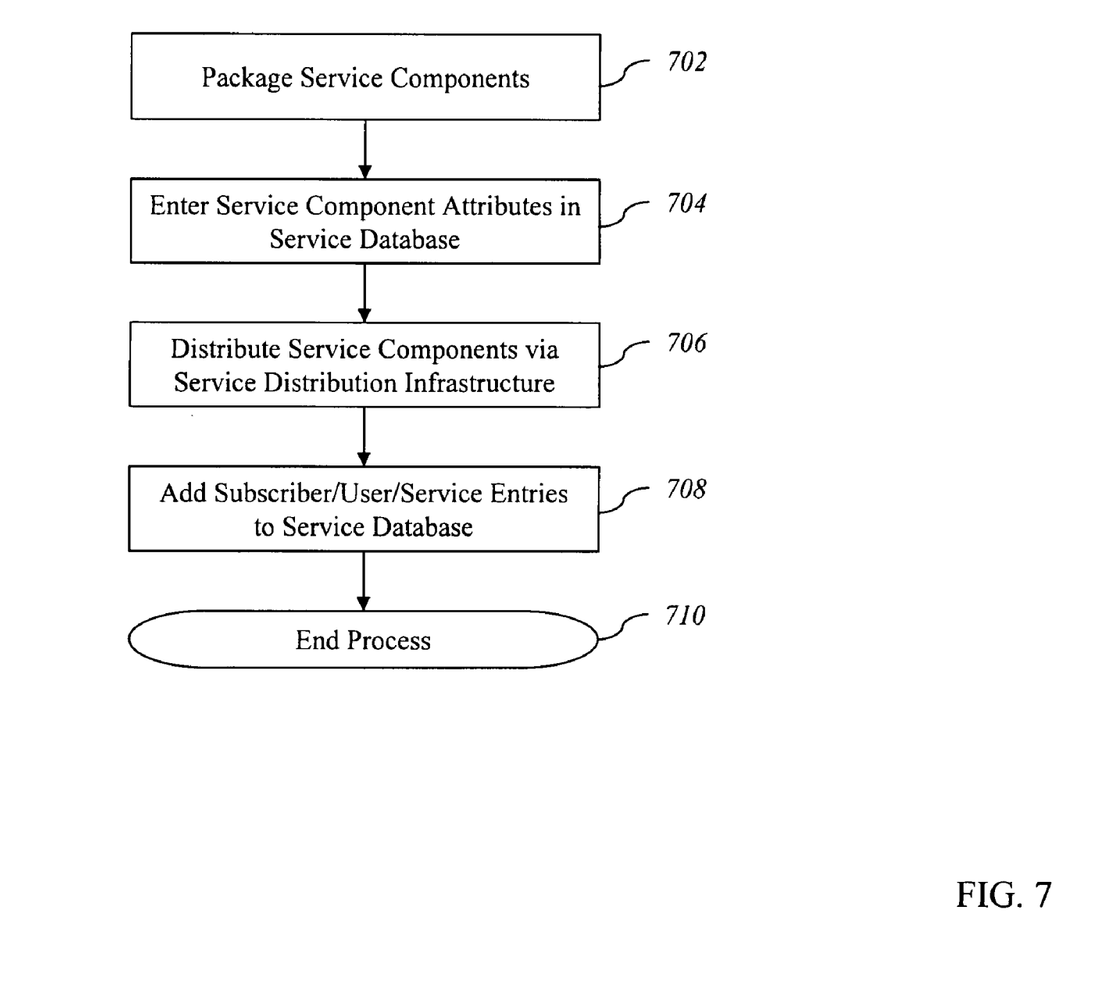
FIG. 7 is a flow chart illustrating a method of remotely installing system components according to exemplary embodiments of this invention.

Exemplary Embodiments of this invention include administrative tools for the service provider. For example, the service provider may use a variety of methods for installing applications within the service provider's network. It may be more difficult to install components within the subscriber's home. In order to perform these installations, the service provider has three basic options: (1) the subscriber and/or authorized user performs the install; (2) the service provider sends someone to the subscriber's home to perform the install; or (3) the service provider installs the components remotely. FIG. 7 is a flow chart illustrating a method of installing the components remotely in an exemplary embodiment of this invention. In the embodiment shown, the service provider creates packages for distributing the components of a particular service [block 702}. The term "package" is to be defined broadly. For example, a package may comprise a .cab (cabinet) file or some other type of self-extracting file. A package may also comprise information stored in a software distribution product, such as Microsoft's System Management Server (SMS). Software distribution products automate the process of distributing software across both homogeneous and heterogeneous networks.

In the embodiment shown in FIG. 7, the provider next enters service component attributes in the service database [block 704]. The residential communications gateway uses these attributes to determine where to direct user requests as illustrated in FIG. 4. Once the package has been created, the service provider distributes the components via a service distribution infrastructure [block 706]. The infrastructure includes the automated software distribution system, if present, along with any necessary software and/or hardware for distributing and installing the components. In the embodiments shown, a user cannot access a service until the service provider authorizes that user. In order to authorize the user to utilize a particular service, the service provider adds a user-service relationship entry to the service database [block 708]. The residential communications gateway searches for the user-service entry whenever a user requests a particular service.

In exemplary embodiments of this invention, the provider has numerous opportunities to add value for a subscriber. Consequently, the provider has various options for deriving revenue from the installation, recapturing installation costs, provisioning, and support of the various services. For example, a provider may charge the subscriber a monthly charge for each registered service. The service provider may also charge the subscriber a monthly charge for equipment rental for the residential communications gateway, application services gateway, and other components present in an embodiment. In addition, the service provider may establish a minimum service contract period whereby the subscriber is penalized for an early termination.

In addition, the provider may derive revenue from other sources, such as third-party application and content service providers. If the provider of the network and infrastructure provides a mechanism for subscribers to access a third-party service, the provider may charge the third party for providing the mechanism. The third party, in turn, charges the subscribers for accessing the service.

While several exemplary implementations of embodiments of this invention are described herein, various modifications and alternate embodiments will occur to those of ordinary skill in the art. For example, the next generation "softswitch" in the telecommunications industry simply replaces a service control point (SCP) with an "application server." This application server is a conventional computer server that also includes triggers for telecommunications services so that "new entrants" into telecommunications services (e.g., new telecommunications service providers) don't have to purchase expensive hardware and equipment to process telephone communications. This next-generation packet network represents an alternative operating environment for the systems, methods, programs, and apparatuses of this invention. Here the telecommunications switch includes a packet-based "softswitch." This "softswitch" uses software control to provide voice, data, and video services by dynamically changing its connection data rates and protocols types. An application server interfaces with the "softswitch" via a packet protocol, such as Session Initiation Protocol (SIP). This application server includes voice service protocols, triggers, and operations that allow the residential network 104, the telecommunications network 120, and/or the data network 130 to interoperate. Accordingly, this invention is intended to include those other variations, modifications, and alternate embodiments that adhere to the spirit and scope of this invention.

The invention claimed is:

1. A method for managing network-based access to computer applications, comprising:

identifying by a web server a first application executing within a residential network;
determining by the web server a residential address in the residential network for accessing the first application;
creating a portal webpage comprising a first link to the residential address in the residential network home and a second link to a second application executing outside the residential network on a service provider network;
storing the portal webpage in memory of a residential communications gateway communicating with the residential network and with the service provider network;
storing a services database in the residential communications gateway that associates services to users and to devices;
registering the users in the services database to associate each user of the users to a device and to a service offered by a service provider over the service provider network;
receiving a request for service at the residential communications gateway identifying a requested service for a requesting user at a requesting device;
searching the services database for the requesting user;
determining the requesting user is authorized to access the requested service from the requesting device;
executing an application programming interface by a processor in the residential communications gateway that associates multiple users of the communications device with at least one available application on the residential network and with at least one available application on the service provider network;
creating an entry in the service database that links the requested service to the requesting user when the requesting user is authorized to access the requested service; and
displaying a website link in the portal webpage that provides access to the requested service.

2. The method of claim 1, further comprising accessing other communications devices from the residential communications gateway.

3. The method of claim 1, further comprising accessing other communications devices from the portal webpage.

4. The method of claim 1, further comprising executing a service application.

5. The method of claim 1, further comprising means for communicating with the residential network.

6. The method of claim 1, further comprising means for communicating with the service provider network.

7. The method of claim 1, further comprising retrieving a first access address of the first application from the services database.

8. The method of claim 7, further comprising associating the first access address to the website link on the portal webpage.

9. The method of claim 7, further comprising redirecting the request for service to the first access address.

10. A system, comprising:
a processor communicating with memory storing code causing the processor to:
identify a first application executing within a residential network;
determine a residential address in the residential network for accessing the first application;
create a portal webpage comprising a first link to the residential address in the residential network home and a second link to a second application executing outside the residential network on a service provider network;
store the portal webpage in memory of a residential communications gateway communicating with the residential network and with the service provider network;
storing a services database in the residential communications gateway that associates services to users and to devices;
registering the users in the services database to associate each user of the users to a device and to a service offered by a service provider over the service provider network;
receive a request for service at the residential communications gateway identifying a requested service for a requesting user at a requesting device;
search the services database for the requesting user;
determining the requesting user is authorized to access the requested service from the requesting device;
execute an application programming interface in the residential communications gateway, the application programming interface associating multiple users of the communications device in the residential network with at least one available application on the residential network and with at least one available application on the service provider network;
retrieve a destination web page when the residential user is not authorized to access the requested service and redirect the request for service to the destination web page to deny the requested service;
create an entry in the service database that links the requested service to the requesting user when the requesting user is authorized to access the requested service; and
display a website link on the portal webpage that provides access to the requested service.

11. The system of claim 10, wherein the code further causes the processor to access other communications devices from the residential communications gateway.

12. The system of claim 10, wherein the code further causes the processor to access other communications devices from the portal webpage.

13. The system of claim 10, wherein the code further causes the processor to communicate with the residential network.

14. The system of claim 10, wherein the code further causes the processor to communicate with the service provider network.

15. The system of claim 10, wherein the code further causes the processor to retrieve a first access address of the first application from the services database and to associate the first access address to the website link on the portal webpage.

16. The system of claim 15, wherein the code further causes the processor to redirect the request for service to the first access address.

17. A non-transitory computer readable medium storing processor executable instructions for performing a method of managing network-based access to computer applications, the method comprising:
identifying by a web server a first application executing within a residential network;
determining by the web server a residential address in the residential network for accessing the first application;
creating a portal webpage comprising a first link to the residential address in the residential network home and a second link to a second application executing outside the residential network on a service provider network;
storing the portal webpage in memory of a residential communications gateway communicating with the residential network and with the service provider network;

storing a services database in the residential communications gateway that associates services to users and to devices;

registering the users in the services database to associate each user of the users to a device and to a service offered by a service provider over the service provider network;

receiving a request for service at the residential communications gateway identifying a requested service for a requesting user at a requesting device;

searching the services database for the requesting user;

determining the requesting user is authorized to access the requested service from the requesting device;

executing an application programming interface in the residential communications gateway, the application programming interface associating multiple users of the communications device in the residential network with at least one available application on the residential network and with at least one available application on the service provider network;

when the requesting user is not authorized to access the requested service, retrieving a destination web page and redirecting the request for service to the destination web page to deny the requested service; and when the requesting user is authorized to access the requested service, creating an entry in the service database that links the requested service to the requesting user and displaying the website link on the portal webpage to provide access to the requested service.

18. The computer readable medium of claim 17, further comprising instructions for retrieving a first access address of the first application from the services database and associating the first access address to the website link on the portal webpage.

19. The computer readable medium of claim 18, further comprising instructions for redirecting the request for service to the first access address.

* * * * *